(12) United States Patent
Snyder et al.

(10) Patent No.: US 11,350,152 B2
(45) Date of Patent: May 31, 2022

(54) SYSTEMS AND METHODS FOR MANAGING PERSONAL VIDEO RECORDINGS

(71) Applicant: BCE INC., Verdun (CA)

(72) Inventors: Chris Snyder, Toronto (CA); Frederic Tardif, Verdun (CA); Simon Lavigne-Giroux, Verdun (CA); Maxime Carbonneau-Leclerc, Verdun (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 16/722,315

(22) Filed: Dec. 20, 2019

(65) Prior Publication Data

US 2020/0204852 A1 Jun. 25, 2020

Related U.S. Application Data

(60) Provisional application No. 62/783,905, filed on Dec. 21, 2018.

(51) Int. Cl.
| | |
|---|---|
| *H04N 21/4147* | (2011.01) |
| *H04N 21/258* | (2011.01) |
| *H04N 21/433* | (2011.01) |
| *H04N 21/274* | (2011.01) |

(52) U.S. Cl.
CPC ... *H04N 21/4147* (2013.01); *H04N 21/25841* (2013.01); *H04N 21/274* (2013.01); *H04N 21/4334* (2013.01)

(58) Field of Classification Search
CPC ......... H04N 21/4147; H04N 21/25841; H04N 21/4334; H04N 21/274
USPC .......................................................... 386/291
See application file for complete search history.

(56) References Cited

U.S. PATENT DOCUMENTS

| | | | | |
|---|---|---|---|---|
| 2013/0108245 A1* | 5/2013 | Yin | ..................... | H04N 21/4334 386/291 |
| 2015/0100994 A1* | 4/2015 | Phillips | ............ | H04N 21/23103 725/93 |
| 2016/0007074 A1* | 1/2016 | Marsh | ................ | H04N 21/6125 386/299 |

\* cited by examiner

*Primary Examiner* — Thai Q Tran
*Assistant Examiner* — Nienru Yang

(57) ABSTRACT

Systems and methods of managing personal video recordings are disclosed for providing a network personal video recorder (nPVR) that manages PVR recordings for a plurality of users. Recording scheduling information from a recording request received at the nPVR is checked against existing scheduled recordings and a new recording is scheduled in accordance with the received recording scheduling information if an existing scheduled recording does not already exist. The recording scheduling information received in respective recording requests are associated with respective users to facilitate playback of recorded content and digital rights management.

19 Claims, 8 Drawing Sheets

SYSTEMS AND METHODS FOR MANAGING PERSONAL VIDEO RECORDINGS

CROSS-REFERENCE TO RELATED APPLICATIONS

This application claims priority to U.S. Provisional Patent Application No. 62/783,905, filed Dec. 21, 2018, the contents of which are incorporated by reference herein in their entirety for all purposes.

TECHNICAL FIELD

The present disclosure relates to personal video recordings and in particular to managing personal video recordings for a plurality of users.

BACKGROUND

Content for television viewers is typically provided by a service provider to a set-top-box (STB) that is associated with a television for display thereon. In some instances, these STBs may be provided with personal video recording (PVR) functionality that allows users to record content and playback recorded content at a later date/time.

Currently, recorded content is stored on each individual user's STB. The recorded content may be played back for viewing on the user's television. However, the ability to store and manage personal video recordings using existing PVR technology integrated with commercial STBs is limited.

Accordingly, systems and methods that enable improved managing of personal video recordings remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
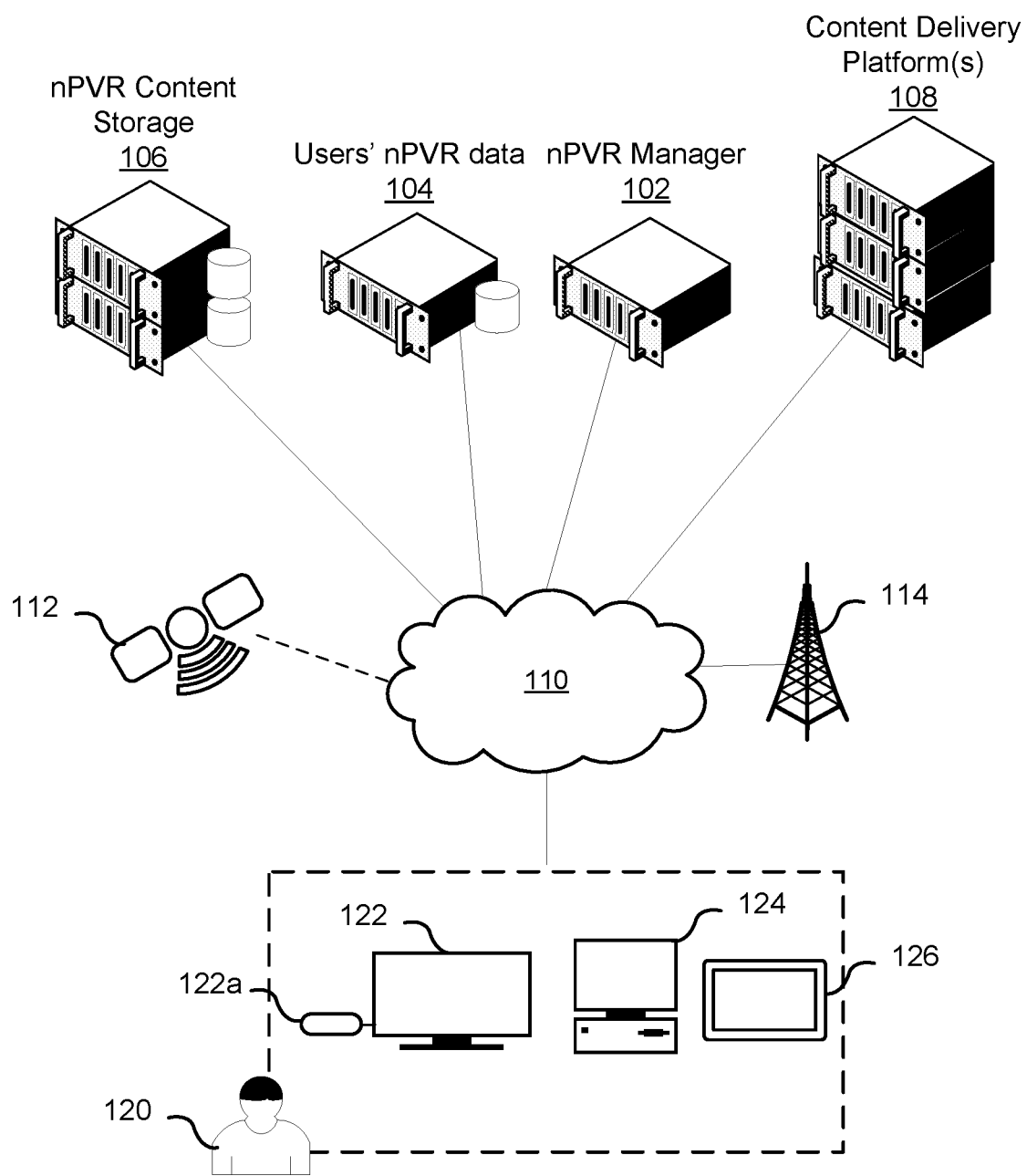
FIG. 1 shows a representation of a system for managing personal video recordings for a plurality of users in accordance with some embodiments.

In accordance with one aspect of the present disclosure, a method of managing personal video recordings is disclosed, comprising: receiving a recording request from a user's device to record content; determining recording scheduling information from the recording request; storing the recording scheduling information for the user; determining if there is an existing scheduled recording that corresponds to the recording scheduling information of the recording request; if there is no existing scheduled recording corresponding to the recording scheduling information of the recording request, scheduling a recording of the content in accordance with the recording scheduling information of the recording request; recording the content during transmission of the content in accordance with the scheduled recording; and storing the recorded content in association with a recording storage identifier associated with the recording scheduling information for the user.

In the above method, scheduling the recording of the content in accordance with the recording scheduling information of the recording request may comprise modifying an existing scheduled recording.

In the above method, modifying the existing scheduled recording may comprise modifying at least one of a start time and an end time specified in the existing scheduled recording.

In the above method, scheduling the recording of the content in accordance with the recording scheduling information of the recording request may comprise scheduling a new recording.

In the above method, the recording scheduling information may comprise a channel number, a date, a start time, and an end time.

In the above method, determining if there is a scheduled recording that corresponds to the recording scheduling information of the recording request may comprise determining if the start time and the end time in the recording scheduling information of the recording request falls within a start time and an end time of a scheduled recording for the same channel number and date.

In the above method, the recording request may comprise a device identifier of the user's device.

In the above method, the recording request may comprise information indicative of a geographic location of the user's device.

In the above method, determining if there is an existing scheduled recording that corresponds to the recording scheduling information of the recording request may comprise determining that an existing scheduled recording is for a geographic area comprising the geographic location of the user's device.

In the above method, the recording storage identifier may be generated after recording of the content.

In the above method, the recording storage identifier may be generated upon scheduling the recording.

The above method may further comprise maintaining a cache of frequently requested scheduled recordings to facilitate the determination of whether there is an existing scheduled recording that corresponds to the recording scheduling information of the recording request.

The above method may further comprise: receiving a playback request from the user's device to playback requested recorded content; validating the playback request against recording scheduling information stored for the user; determining a requested recording storage identifier associated with the recording scheduling information stored for the user corresponding to the requested recorded content; retrieving, using the requested recording storage identifier, the requested recorded content according to the recording scheduling information; and providing the recorded content to the user's device in accordance with the recording scheduling information stored for the user.

In the above method, the user's device from which the playback request is received may be a different device associated with the user than the user's device from which the recording request is received.

In the above method, the requested recorded content retrieved and provided to the user's device may be a portion of the recorded content stored in association with the recording storage identifier as defined by the user's recording scheduling information.

In the above method, providing the recorded content may comprise encrypting the recorded content for transmission to the user's device and providing a decryption key for the user that allows for playback of the recorded content.

In the above method, the decryption key for the user may be generated in response to receiving the playback request.

In accordance with another aspect of the present disclosure, a system for managing personal video recordings is disclosed, comprising: a processing device that interfaces with one or more content delivery platforms to record content in accordance with scheduled recordings, and is communicatively coupled with a plurality of user devices over a network to receive recording requests for recording the content and playback requests for playing back recorded content; a content storage that stores the recorded content in association with a recording storage identifier; and a data storage that stores personal video recording (PVR) data for each of a plurality of users, the PVR data comprising, in association with respective users, recording scheduling information for content that the user has requested to be recorded, and the recording storage identifier associated with the content for retrieval of the recorded content from the content storage.

In the above system, the processing device may be configured to: receive a recording request from a user's device to record content; determine recording scheduling information from the recording request; determine if there is an existing scheduled recording that corresponds to the recording scheduling information of the recording request; store the recording scheduling information for the user in the data storage; if there is no existing scheduled recording corresponding to the recording scheduling information of the recording request, schedule a recording of the content in accordance with the recording scheduling information of the recording request; record the content during transmission of the content in accordance with the scheduled recording; and store the recorded content in association with a recording storage identifier associated with the recording scheduling information for the user.

In the above system, the processing device may be further configured to: receive a playback request from the user's device to playback requested recorded content; validate the playback request against the recording scheduling information stored for the user in the data storage; determine a requested recording storage identifier associated with the recording scheduling information stored for the user corresponding to the requested recorded content; retrieve the requested recorded content from the content storage according to the recording scheduling information and using the requested recording storage identifier; and provide the requested recorded content to the user's device in accordance with the recording scheduling information stored for the user.

The present disclosure describes systems and methods for managing personal video recordings by providing a network personal video recorder (nPVR) that manages PVR recordings for a plurality of users.

The systems and methods disclosed herein allow for users to schedule recordings and request playback of recorded content in the same manner as they do with existing PVR functionality configured for a set-top-box (STB) implementation, however there is no physical limitation on the amount of storage capacity available for the recorded content. The nPVR functionality may, in some implementations, mirror home PVR recordings for the user, however there is no need for the user's STB/PVR to store any content itself and in some implementations the user's STB may be a diskless STB, a TV application that acts as an STB, etc. Because the nPVR can negate the need for storing content on users' STBs while still providing users with essentially the same PVR functionality, service providers may realize a reduction of capital and operating expenditures associated with STB hardware.

In order to reduce an amount of storage and processing capacity required by a network implemented PVR (nPVR) system, while still ensuring users are able to access only the content they specifically have requested to be recorded, the system and methods described herein generate a single recording for a particular program or content regardless of if more than one individual has requested recording of the same or corresponding content. Specifically, in order for a program to be recorded at least one user must request that it be recorded. The recorded content of the invention may extend before and/or after a particular user's request for recording. For example, a first user may schedule the recording of an entire sporting event, while a second user may join the program in progress and record only a portion, such as the end of the sporting event. The nPVR system described herein allows a single version of the requested recording to be stored, but also ensures each individual user is only able to access the portion(s) of the recorded event that they have specifically requested to be recorded. To ensure each user is only able to access the content they have specifically requested to be recorded, the particular recording request details associated with a given user's recording request are stored and checked during playback requests of the recorded content.

In accordance with the present disclosure, when a recording request is received from a user to record content, a check is made to determine if a scheduled recording already exists that corresponds to the recording scheduling information of the received recording request. If there is no scheduled recording corresponding to the recording scheduling information of the received recording request, then the content is scheduled to be recorded. Otherwise, if a scheduled recording corresponding to the recording scheduling information of the received recording request already exists, then there is no need to schedule a new recording for the same or conterminous content corresponding to the recording scheduling information in the received recording request.

Individual users' nPVR data is stored in the cloud, including a list of recordings scheduled to be recorded and/or that have been recorded for the respective users of the system. Each program/content recording entry for a user comprises the recording scheduling information for a given recording request received from the user. The content is recorded as scheduled during its transmission, and stored in the cloud in association with a unique recording storage identifier. The recording scheduling information for each user that requested to record the content is associated with the recording storage identifier to facilitate retrieval of the recorded content during playback. In this way, recording scheduling information for each user's requested recordings and the corresponding recording storage identifier can be used for retrieving the recorded content in response to playback requests, as well as for the purposes of digital rights management, as described in more detail herein.

In accordance with the systems and methods disclosed herein, the nPVR (and specifically the nPVR manager) can be provided in a scalable manner whereby the nPVR of the present system can manage the recording and playback of content for millions of STBs. The systems and methods disclosed herein allow for tracking of user recording request data so that only a single recording of content needs to be effectively recorded and stored in the network even when a plurality of corresponding recording requests are received from a plurality of users to record the same content. That is, there is no duplication of scheduled recordings (e.g. there are not multiple scheduled recordings to record the same content), and there is no duplication of the recorded content itself, thereby reducing processing and storage requirements and improving the scalability and effectiveness of the nPVR implementation. The nPVR system disclosed herein can also integrate with multiple TV middleware platforms, including cable television networks, satellite television networks, IPTV networks, over-the-top (OTT) networks, etc., maintain data for the users of all systems collectively, and accordingly recording requests and scheduled recordings can effectively be de-duplicated across multiple content delivery platforms.

Maintaining users' nPVR data also allows for the recording of content and playback of recorded content to be in compliance with relevant copyright laws. For example, in jurisdictions where it is required that users must actively select to record content for it to be made available to the user at a later time, the nPVR can ensure that at least one user has requested to record the content before recording the content, and can easily maintain information indicative of which users have requested to record which content. Additionally, the nPVR of the invention can ensure that a user can only playback content according to the particular recording scheduling information received in a recording request received from the user. The systems and methods disclosed herein can prevent a user from playing back content or portions of content that they did not request to record, even though a copy of that recorded content may exist in the nPVR. Similarly, if a user requests to record content part way through the content transmission (i.e. after a program has started), the systems and methods disclosed herein can allow for only permitting playback of the portion of recorded content corresponding to what the user actually requested to record, even though a full copy of the program/content may be recorded in the nPVR storage.

Embodiments are described below, by way of example only, with reference to FIGS. 1-7.

FIG. 1 shows a representation of a system for managing personal video recordings for a plurality of users. The system comprises various servers and storage repositories for implementing a network PVR (nPVR) for a plurality of users. As depicted in FIG. 1, the nPVR comprises an nPVR manager 102, users' nPVR data 104, and nPVR content storage 106. Although shown as separate components it will be appreciated that these entities could be integrated into one or more components as well as distributed throughout a network environment. The nPVR also interfaces with content delivery platform(s) 108 which are used to deliver content (for scheduled transmissions and/or playback) to a plurality of STBs and/or other user devices over various platforms including a cable television network, a satellite network (represented by satellite 112), a cellular network (represented by cellular tower 114), and/or other networks 110 (e.g. the Internet, IPTV, over-the-top (OTT)). The nPVR may, for example, be managed by a video or television service provider that also delivers television content to users through the various content delivery platform(s) 108. Alternatively, the nPVR may be provided by and managed by a third party different than the video or television service provider, but interfaces with and/or has access to the content delivery platform(s) 108 for recording and playback of the content.

It will be readily apparent to a person skilled in the art that the elements of the nPVR depicted in FIG. 1 (namely the nPVR manager 102, users' nPVR data 104, and nPVR content storage 106) are represented and described as unique and distinct components (servers/storage repositories) for the purpose of explanation only to describe the functionality of the nPVR system of the invention. In implementation, more or fewer elements of the nPVR may exist to provide the functionality described herein, and the nPVR may be distributed across a plurality of servers that are provided in the cloud network.

The nPVR interfaces with user devices (e.g. STBs, tablets, smartphones, etc.) over the Internet or other suitable network (e.g. privately managed IP network). As will be appreciated by a person skilled in the art, the nPVR as described herein is capable of managing personal video recordings for millions of users, although for the sake of explanation only a single user 120 is shown in FIG. 1. The user 120 may have several user devices that are connected to the network 110 (e.g. the Internet or other IP network) and that they use to watch content. FIG. 1 shows, for the sake of example, that the user devices include a television 122 with associated set-top-box (STB) 122a, a computer 124, and a tablet 126, although the user devices are not limited to such.

Content along with various types of metadata and/or other data (e.g. subtitles, EPG guides, etc.) can be provided to the STB 122a over various networks using the content delivery platform(s) 108, including but not limited to a cable television network, a satellite network, an IPTV network, and/or an over-the-top (OTT) network. The user 120 may request to record specific content, whether scheduling to record the content in real-time (i.e. content is currently in progress or playing) or to schedule a recording at a future date/time. The user 120 may trigger the recording request through a TV remote or other device whose signal is received by the STB 122a. For example, the user 120 may browse upcoming video content displayed in an EPG on TV 122, and select to record a particular program. In other instances, the user 120 may be watching content on their TV 122 and press a record button on their TV remote to record the content, or the user may press a pause button which may initiate recording of the content. The STB 122a formulates a recording request and sends it to the nPVR manager 102 over the network 110 such as over the Internet or privately managed IP network.

As the STB 122a is not required to provide any conventional PVR functionality due to the provisions of the nPVR system disclosed herein, the STB 122a may be a diskless STB or even an application running on television 122. Removing the requirement for a physical STB with embedded storage capacity for providing PVR functionality may help to reduce both capital and operating expenditures for service providers. However, the systems and methods disclosed herein may also be implemented in conjunction with an STB 122a providing conventional PVR functionality.

In accordance with the system of FIG. 1, the nPVR manager 102 may be responsible for and configured to receive recording requests from users to record content, schedule recordings in accordance with the received recording requests, cause recording of the content in accordance with recording scheduling information, track which users have recorded what content, receive playback requests from users, and facilitate appropriate playback of recorded content.

In particular with reference to FIG. 1, the nPVR manager 102 is configured to receive a recording request from the user 120 to record content. The received recording request comprises recording scheduling information indicative of what the user wishes to record including a channel number, a date, a start time, and an end time. The recording scheduling information may be generated by the STB 122a in response to user input, for example by the user selecting a particular program displayed on an EPG. In some instances the recording request may comprise information indicative of the recording scheduling information. For example, the recording request may indicate a channel number, an indication that the user wishes to record the first run of a particular program, and that the user wishes to start recording five minutes after the program's scheduled start time and record until five minutes after the program's scheduled end time. The nPVR manager 102 may then determine the date and scheduled start/end times of the first run of the program on that channel in order to determine the recording scheduling information. In still another example, the recording request may only indicate a program name, and the nPVR manage 102 determines the appropriate channels for recording the content and the scheduled start/end times to determine the recording scheduling information. If a user pauses a channel that they are currently viewing, a recording request may be generated that indicates the channel number, the start time as a time when the pause button was pressed, and an end time such as the scheduled end time of the program or customizable to be 5 minutes after the scheduled end time of the program, etc. Aspects of the recording scheduling information provided in a recording request may be customizable by the user 120 in a user interface displayed on their device when a recording request is initiated.

The recording request may also contain other information such as information identifying the user or subscriber 120. For example, the recording request may comprise an identifier indicative of the source device (e.g. STB 122a) that the recording request originated from. This information can be used to facilitate playback of recorded content, as will be discussed in more detail herein. Additionally, other information contained within the recording request may include information indicative of a geographic location of where the recording request originated from (or alternatively the location may be derived from the indication that the recording request originated from STB 122a).

When the nPVR manager 102 receives the recording request from a device associated with the user 120 and determines the recording scheduling information from the received recording request, a determination is made as to if there is already a scheduled recording that corresponds to the recording scheduling information of the received recording request. If there is currently no scheduled recording to record the content in accordance with the received recording scheduling information, the nPVR manager 102 schedules a recording of the content.

For example, the nPVR manager 102 may store a list of all scheduled recordings, and determining if there is a scheduled recording that corresponds to the recording scheduling information in the received recording request may comprise determining if a recording is already scheduled for the same channel number on the same date, having a start time equal to or earlier than the start time indicated by the recording scheduling information in the received recording request, and an end time equal to or later than the end time indicated by the recording scheduling information in the received recording request. In this manner, if a scheduled recording already exists for the same channel number on the same date that starts and ends five minutes before and after the scheduled start and end time of the program, and the recording scheduling information for the received recording request only requests for recording content to start and end at the scheduled start and end time of the program, the scheduled recording is considered to correspond to the recording scheduling information of the received recording request and no new recording needs to be scheduled. On the other hand, if an existing scheduled recording for the same channel number on the same date starts and ends at the scheduled start and end time of the program, but the recording scheduling information for the received recording request requests for recording to start and end five minutes before and after the scheduled start and end time of the program, there is considered to be no scheduled recording corresponding to the recording scheduling information of the received recording request because the received recording request is requesting to record more content than specified by the existing scheduled recording, and the scheduled recording for recording of the content is thereby modified (i.e. scheduled in accordance with the recording scheduling information of the received recording request). The recording scheduling information for a scheduled recording of content that encompasses all of the recording scheduling information for various users received in the recording requests may be referred to as global scheduling information and is used to schedule/control recording of the content.

Accordingly, in this way only a single recording of the content in accordance with the global scheduling information needs to be scheduled, recorded, and stored for playback, even though the recording scheduling information of received recording requests from a plurality of users for the given program may vary. This prevents duplicate recordings, and helps to improve the scalability of the nPVR system.

The nPVR manager 102 stores the recording scheduling information for each user recording request that has been received in users' nPVR data 104. The users' nPVR data 104 may be responsible for and configured to store PVR data for the plurality of users utilizing the nPVR that includes a list of recordings for each user comprising the recording scheduling information for each piece of content that they have scheduled to be recorded and for content that has already been recorded. The recording scheduling information for each program that is stored for a user helps to identify what recorded content the user is able to playback, and facilitates digital rights management.

The nPVR manager 102 also associates a recording storage identifier with each recording scheduling information entry that has been stored for a user in the users' nPVR data 104. The recording storage identifier is a unique identifier that is associated with each recorded program and used for retrieving recorded content that the user has requested to record. The recording storage identifier may be generated upon first instance of the scheduling of a particular recording and immediately associated with recording scheduling information when subsequent recording requests for the same program are received, or the recording storage identifier for a given program that has been requested to be recorded may be generated after the content has been recorded and subsequently associated with recording scheduling information stored for each user who has requested to record the content.

The nPVR content storage 106 may be responsible for and configured to store the recorded content in association with its specific recording storage identifier. The nPVR manager 102 is configured to co-ordinate recording of content in accordance with the global scheduling information of a scheduled recording as it is transmitted from the content delivery platform(s) 108. The nPVR manager 102 may access the content delivery platform(s) over the network 110 (such as the Internet or other suitable network) for co-ordinating the recording of content that is being transmitted to users, and storing the recorded content in the nPVR content storage 106, for example. All recorded content is stored in association with its corresponding unique recording storage identifier. Each item of recorded content may also be stored as an encrypted file to prevent unauthorized playback, as described in more detail below.

A given piece of recorded content comprises the content that would have actually been transmitted to the user in real-time, including relevant advertisements that have been slotted into the content for transmission. Accordingly, where advertisements are inserted into content based on geographic locations of viewers, the determination of whether a scheduled recording already exists that corresponds to the recording scheduling information of a newly received recording request may also consider whether the pre-existing scheduled recording (if any) is associated with a geographic area comprising the geographic location that a recording request is received from (or a home address of a registered device from which the recording request is received from). As described above, the location from which a recording request is received from may be included in the recording request or determined from information contained in the recording request such as information identifying the STB that the recording request originates from.

Additionally, even though recorded content for all users is stored in the network on nPVR content storage 106 and there is actually no hardware in the nPVR dedicated to each specific user, the amount of nPVR storage capacity that a given user is able to access and record on may still be restricted, based on a user's subscription to the nPVR service for example. For example, when the nPVR manager 102 receives a recording request from the user 120, the nPVR data for the particular user may be accessed to determine if the content may be recorded based on the amount of storage capacity defined in the user's subscription.

The user 120 may request to playback his/her recorded content. The playback request may be initiated from any authorized user device including the television 122, STB 122a, computer 124, or tablet 126 or smartphone. User devices may be registered and associated to a given user and stored as part of the user's nPVR data so that the nPVR manager 102 can identify the appropriate user's nPVR data when a playback request is received from a particular user device. Accordingly, the playback request may comprise an indication of the user device from which the playback request originated from, in addition to indicating the particular recorded content desired for playback. Playback of recorded content may be achieved by any authorized device associated with the user 120 having a connection to the video service provider over the network 110 (e.g. over the Internet or other suitable network). Furthermore, it will be appreciated that recorded content stored in the nPVR content storage 106 may also be stored in multiple bitrate formats to support playback on different user devices as well as to support different speed levels and quality of the network connection.

In some embodiments, the playback request may not be restricted by geographic location; however recorded content that the user will have access to is content that was recorded for the user and would have been transmitted to the user had the user been watching the content in real-time. Accordingly, blackout restrictions, advertisements displayed during playback of the recorded content, etc., will be based on the location from where the user recording request originated (e.g. the location of the STB 122a), and not the location of the user device when the user requests playback of recorded content.

The playback request may be received at the nPVR manager 102. For example, the user 120 may view their nPVR data on a display of the television 122, computer 124, or tablet 126, and make a selection via a user input interface that they wish to playback a certain recorded content (or program). The recorded content requested for playback is associated with a recording storage identifier that was associated with user recording scheduling information as described above. Accordingly, the nPVR manager 102 can determine the recording storage identifier (either included in the playback request or from the user's nPVR data 104) for retrieving the recorded content from the nPVR content storage 106. The recorded content can be provided to the user device via the appropriate content delivery platform(s) 108. For example, if the playback request originated from the tablet 126 connected to a cellular network, the recorded content may be provided to the tablet 126 over the network 110 (such as the Internet or other suitable network) via the cellular network (e.g. via cellular tower 114).

However, the user 120 may only be able to playback content that they have actually requested to be recorded. For example, even if one full hour of a recorded program/content exists for a program that was aired from 7:00 pm to 8:00 pm but the user 120 only requested to record the content partway through the program at 7:15 pm for example, the user 120 will not be able to playback the recorded content corresponding to the portion of the program that aired from 7:00 pm to 7:15 pm even though this portion of content exists in storage. When a playback request is received at the nPVR manager 102, the recording scheduling information for the user associated with the device from where the playback request was received is examined to determine whether the user is allowed to playback the entirety of the requested recorded content or a portion of the recorded content, or whether the user is not allowed to playback the requested recorded content at all. Only the portion(s) of the recorded content that the user has requested to record as per their recording scheduling information is provided to the user's device for playback. Accordingly, even though trickplay functionality may be enabled for playback of the recorded content (e.g. 30 second skip ahead, 7 second skip back), the user 120 may not be able to skip back to any portion of the program that aired from 7:00 pm to 7:15 pm because they are not provided with this portion of the recorded content.

In some implementations, the recorded content in the nPVR content storage 106 may be encrypted for transmission to the user's device, and the user 120 may be provided with a specific encryption key or token for decrypting the recorded content. The encryption key may be generated in response to the playback request. In other implementations the recorded content in its entirety or segments thereof may be stored as an encrypted file with the encryption key provided to the user's device for playback of the segments that they are allowed to view.

The nPVR manager 102 may be adapted to generate the encryption key. An encryption key for a given recording may be generated for each user that requested to record the content upon recording of the content and then stored in the users' nPVR data in association with respective user recordings, and/or it may be generated using just-in-time processing (JITP) in response to user playback requests. As an example, the nPVR manager 102 may receive a playback request for recorded content, determine the recording storage identifier for the recorded content, retrieve the recorded content from the nPVR content storage 106, and provide the recorded content to a given user device from which the playback request was received from via content delivery platform(s) 108, providing an encrypted version of the recorded content along with a specific encryption key corresponding to the recorded content for the user. Additionally or alternatively, the nPVR manager 102 may provide the user device from which the playback request was received from with the recording storage identifier and encryption key associated with the recorded content, and the user device itself may access the nPVR content storage 106 for playback of the recorded content.

Figure 2:
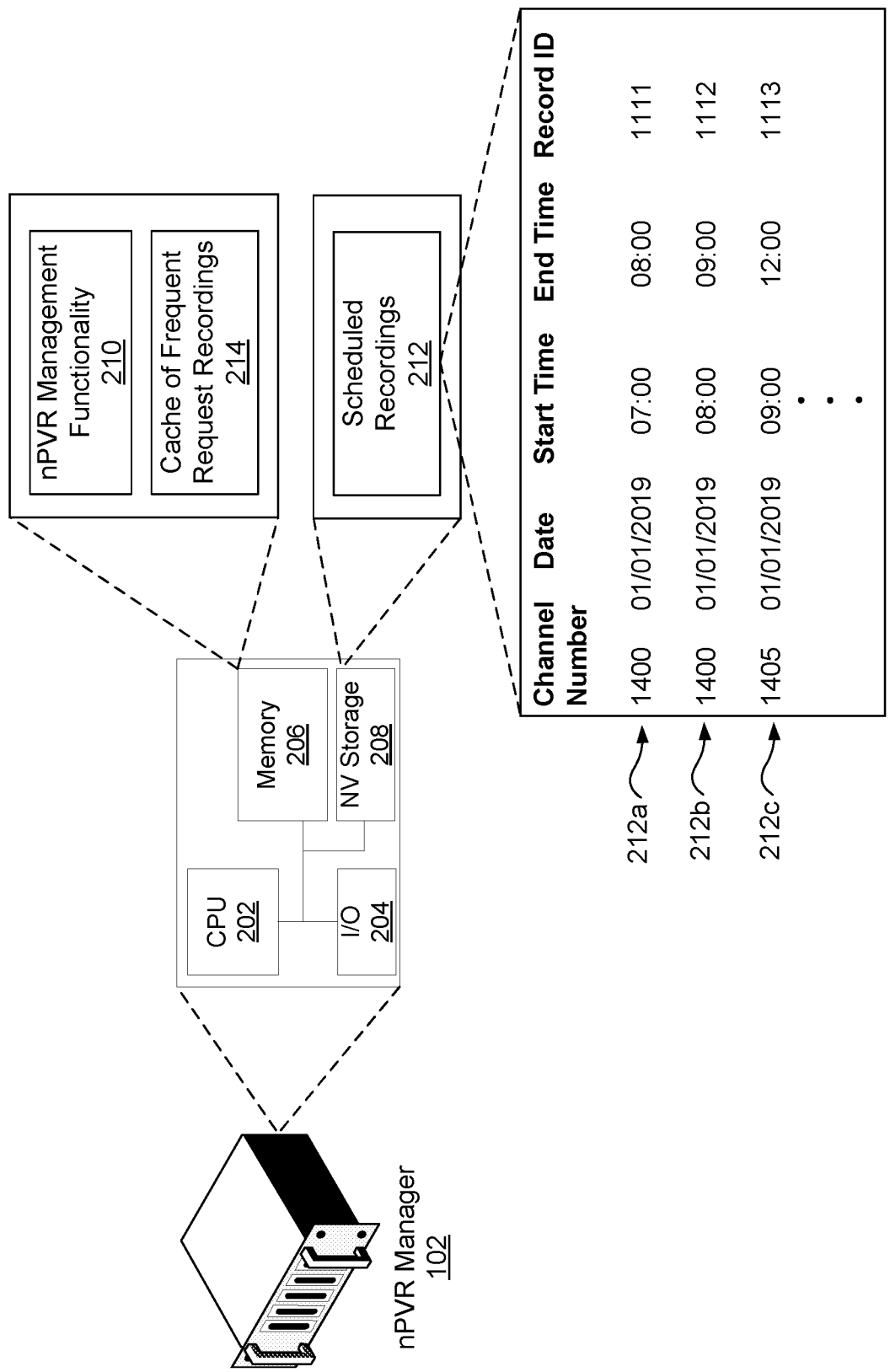
FIG. 2 shows a representation of a nPVR manager in accordance with some embodiments.

FIG. 2 shows a representation of a nPVR recorder in accordance with some embodiments. In one example, the nPVR manager 102 may be implemented as a server comprising a processing device (CPU 202), an input/output interface 204, a memory 206, and non-volatile storage 208.

The input/output interface 204 may provide a communication interface that allows for the nPVR manager 102 to communicate with external devices such as user devices, other elements of the nPVR (e.g. users' nPVR data 104, nPVR content storage 106), content delivery platform(s) 108, etc. over the Internet or any other suitable transmission network (e.g. a privately managed IP network). For example, recording requests and playback requests from user devices may be received at the CPU 202 via the I/O interface 204.

The memory 206 may store non-transitory computer-readable instructions that are executable by the CPU 202. For example, the memory 206 may store nPVR management functionality 210 that configures the nPVR manager 102 to perform certain functionality as has been described with reference to FIG. 1 and/or perform at least some of the methods described herein.

The non-volatile (NV) storage 208 may store a list of scheduled recordings 212. As described with reference to FIG. 1, the nPVR manager 102 may be configured to schedule recordings in accordance with recording requests received from users and to record content in accordance with the scheduled recordings. As depicted in FIG. 2, the list of scheduled recordings includes global scheduling information for each recording 212a-c. For example, scheduled recording 212a corresponds to channel number 1400 on Jan. 1, 2019, starting at 7:00 and ending at 8:00. The recordings 212a-c may each also be associated with a respective recording storage identifier ("Record ID" in FIG. 2), such as the case when the recording storage identifiers are generated upon initial scheduling of each recording. As described with reference to FIG. 1, when the nPVR manager 102 receives a user recording request, the CPU 202 can check the list of scheduled recordings 212 to determine if there is already a scheduled recording that corresponds to the recording scheduling information indicated in the received recording request. The determination of whether a corresponding scheduled recording already exists can be based on a comparison of the recording scheduling information for the user received in the recording request to the global scheduling information and/or the recording storage identifier of the recordings 212a-c in the list of scheduled recordings 212.

Furthermore, though not depicted in FIG. 2 the global scheduling information of each recording may comprise or be associated with a geographic area to facilitate recording of the content that is actually delivered to that geographic area. In some instances different channels may exist for different geographic regions, and so the channel number may provide an indication of the geographic area associated with the content being recorded. In other instances the same channel may be available to all viewers across a country but with different advertisements inserted depending on state/province/city that the viewer is located in, for example, and in such cases a geographic area may be associated with the global scheduling information in addition to the channel number and also used when determining whether corresponding scheduled recordings exist. Where the nPVR content storage 106 is distributed across multiple locations, the geographic area associated with the global scheduling information may also be used to indicate where the recorded content should be stored (i.e. in a content storage that is located within or closest to the geographic area).

Furthermore, the nPVR manager 102 may maintain a cache of frequently requested recordings 214 as a subset of the list of scheduled recordings 212. The cache of frequently requested recordings 214 is shown in FIG. 2 as residing in memory 206 for the sake of example, though it could exist in the non-volatile storage 208 or elsewhere. Maintaining a cache of frequently requested recordings 214 may make it easier to determine if there is a scheduled recording that corresponds to the recording scheduling information received in a given user recording request by caching select recordings that are frequently associated with recording requests. For example, it may be envisioned that many users interacting with the disclosed nPVR may wish to record the Super Bowl. The cache of frequently requested recordings 214 may comprise the scheduled recording(s) associated with the Super Bowl, and accordingly when a new recording request is received for the Super Bowl the CPU 202 may be able to more quickly determine if there is already a scheduled recording corresponding to the recording scheduling information of the new recording request by accessing the cache 214, as opposed to parsing the entire list of scheduled recordings 212 which may be slower processing due to a very large number of scheduled recordings. The cache of frequently requested recordings 214 may have the same general format as the list of scheduled recordings 212.

Figure 3:
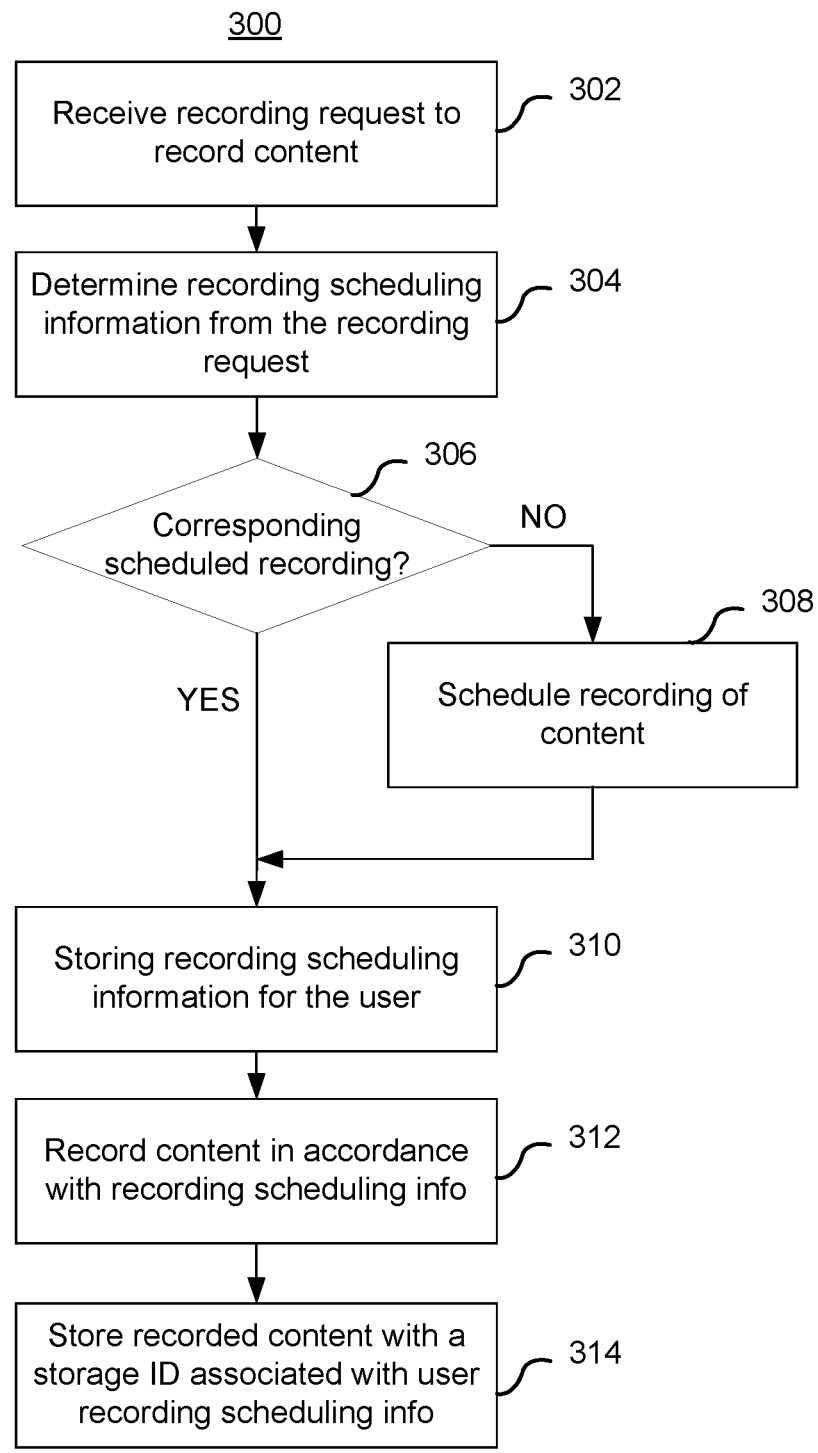
FIG. 3 shows a method of managing personal video recordings in a network-based PVR implementation.

FIG. 3 shows a method of managing personal video recordings in a network-based PVR implementation. The method 300 may be performed by the nPVR manager 102. For example, the CPU 202 of the nPVR manager 102 may configure the nPVR manager 102 to perform the method 300 by executing non-transitory computer-readable instructions stored in memory 206. The nPVR management functionality 210 described with reference to FIG. 2 may configure the nPVR manager 102 to perform the method 300 when executed by the CPU 202.

A recording request to record content is received (302). The recording request may be received from a user through a user device that is connected to the nPVR manager 102 through the Internet or other suitable network. Recording scheduling information specific to the received recording request is determined (304). As described with reference to FIG. 1, the recording scheduling information may comprise a channel number, a date, a start time, and an end time. The recording scheduling information may be provided in the received recording request itself, or the received recording request may contain indicative information that can be used by the nPVR manager 102 to determine the user-specific recording scheduling information.

A determination is then made if there is already a scheduled recording corresponding to the received recording scheduling information (306). The determination involves checking a list of scheduled recordings, as depicted in FIG. 2 for example. Determining if there is an existing scheduled recording corresponding to the recording scheduling information of the received recording request may comprise determining if the start time and the end time indicated in the recording scheduling information of the received recording request falls within a start time and an end time of an existing scheduled recording for the same channel number and date. If there is no existing scheduled recording that corresponds to the recording scheduling information of the received recording request (i.e. NO at 306), the content is scheduled to be recorded (308) in accordance with the recording scheduling information of the received recording request. Scheduling the recording in accordance with the recording scheduling information of the received recording request may comprise modifying a currently scheduled recording's global scheduling information (e.g. to encompass the start and end times indicated by the recording scheduling information of the received recording request), or scheduling a new recording altogether.

The recording scheduling information for the user is stored (310). The recording scheduling information or information indicative of the recording scheduling information is stored regardless of whether there was an existing scheduled recording corresponding to the recording scheduling information (i.e. YES at 306) or whether the content is scheduled to be recorded (i.e. at 308) in response to the received recording request. The recording scheduling information for the user may be stored prior to determining whether there is already a scheduled recording corresponding to the received recording scheduling information. The content is recorded in accordance with the global scheduling information of the scheduled recording (312). As previously described, the content is recorded during transmission, in the format in which it is transmitted (e.g. with all relevant advertisements for the date and location that would have been delivered to the viewers watching the content as transmitted in real-time). The recorded content is stored in association with a recording storage identifier that is associated with the recording scheduling information for the user (314), which helps to facilitate retrieval of the recorded content for playback and digital rights management purposes. The recorded content may be stored in multiple bitrate formats for playback.

Figure 4:
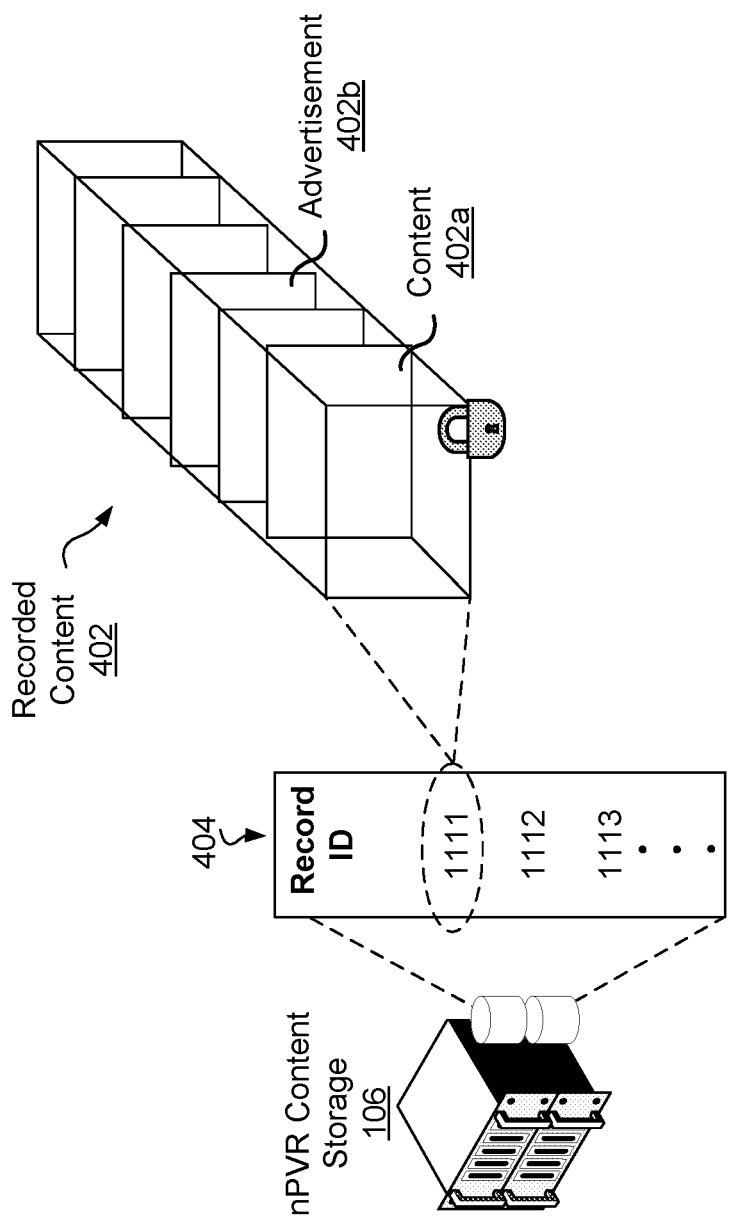
FIG. 4 shows an example representation of stored nPVR content.

FIG. 4 shows an example representation of stored nPVR content. Recorded content may be stored on nPVR content storage 106, which may be a form of storage repository. The nPVR content storage 106 may only need to store recorded content 402 and a recording storage identifier 404 that is associated with the recorded content 402. The recorded content 402 may comprise some or all metadata that was associated with the content when transmitted to viewers. Of course, the nPVR content storage 106 may store other information as well, such as global scheduling information, however it is not necessary and has therefore been omitted from FIG. 4.

From FIG. 2, the recorded content 402 associated with recording storage identifier "1111" may correspond to a particular program that aired on channel 1400 on Jan. 1, 2019, starting at 7:00 and ending at 8:00. The recorded content 402 may comprise both frames of content 402a and frames of advertisements 402b, as has been previously described. As has also been previously described, the recorded content (e.g. recorded content 402) or segments thereof may be stored and/or transmitted as an encrypted file (as indicated by the lock icon).

Figure 5:
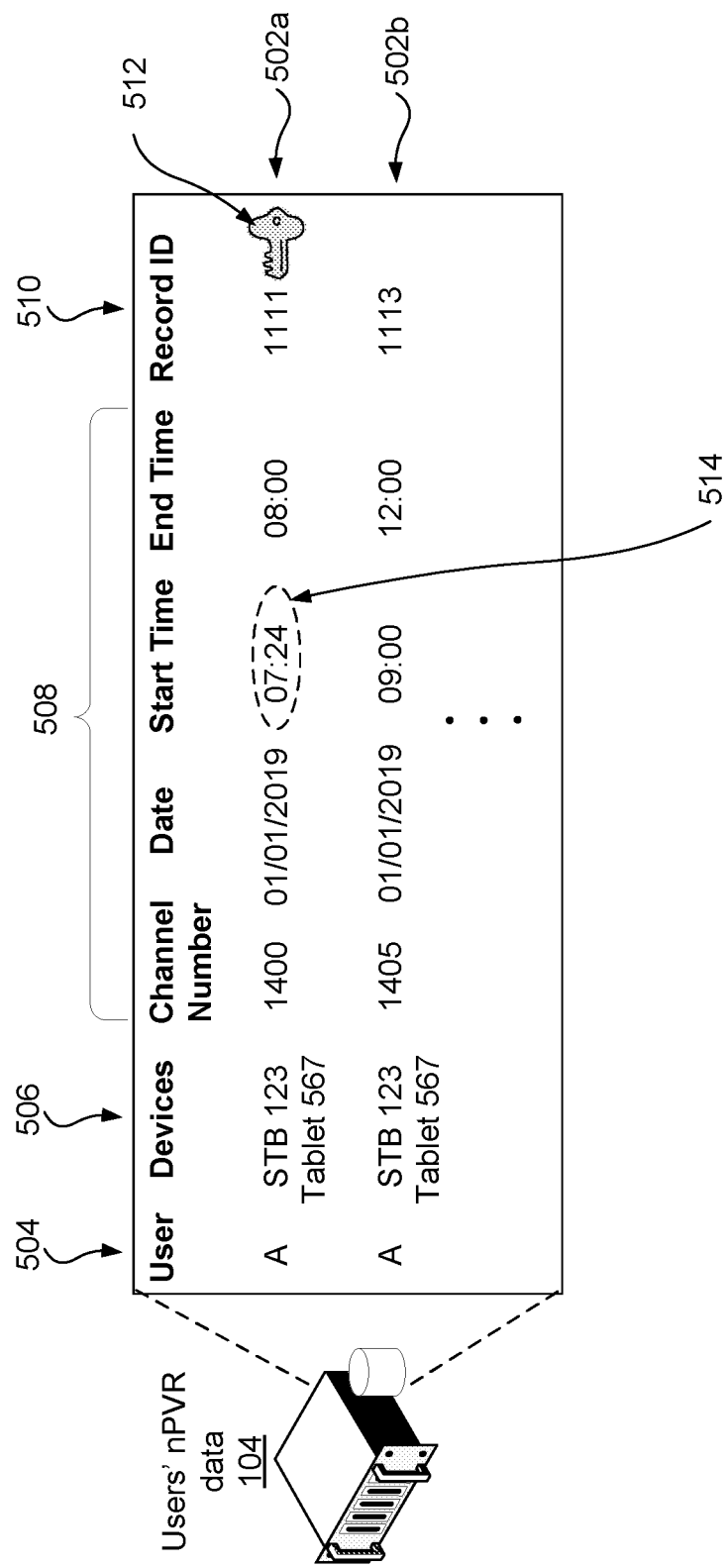
FIG. 5 depicts an example representation of individual users' nPVR data.

FIG. 5 depicts an example representation of individual users' nPVR data. The users' nPVR data 104 may, for example, be stored in a storage repository that stores nPVR data for a plurality of users. For the sake of simplicity and explanation, the nPVR data depicted in FIG. 5 is only represented as comprising the requested recordings for a single user (user A), but it will be readily appreciated that users' nPVR data 104 will generally comprise data for a plurality of users. Furthermore, there will typically not necessarily be dedicated hardware in the nPVR system for respective users.

The nPVR data depicted in FIG. 5 shows at least some of the relevant nPVR data that may be stored for the user, though what the user actually sees when interacting with the nPVR may differ. For example, the user may access their nPVR data and see only a program name, date, and start/end time, and possibly in conjunction with a thumbnail or other icon representing the associated content. The nPVR data depicted in FIG. 5 comprises a list of two recordings or recording entries, 502a and 502b for user A. The recordings stored in the users' nPVR data 104 may comprise both recording entries for content that is scheduled to be recorded, for example recording 502b, and recording entries for content that has been recorded, for example recording 502a. Each recording entry may comprise information including the user 504 for which a recording has been scheduled and/or recorded, authorized user devices 506 that have been registered and are associated with the user, user-specific recording scheduling information 508 including a channel number, a date, a start time, and an end time, and a recording storage identifier 510 specific to the requested recorded content. Each recording entry may also comprise or be associated with an encryption key 512 for playback of the content, as described previously.

In FIG. 5, the recording entries 502a and 502b pertain to user A, such as user 120 in FIG. 1. The devices associated with user A may be a STB and a tablet, such as STB 122a and tablet 126 in FIG. 1. The user 120 (or in some cases the television service provider) may configure a profile for the nPVR service that indicates authorized devices associated with the user so that recorded content may be played back on any such devices associated with/registered to the user. The user devices may be identified by a MAC address or any other suitable hardware identifier, for example.

As has been previously described the recording scheduling information 508 specific to an individual user's request to record content may be included in a received recording request or may be derived from information included in a received recording request. This recording scheduling information 508 is stored for the user (for each user recording request) regardless of whether there was already an existing scheduled recording corresponding to said recording scheduling information of a received recording request or if a new recording is scheduled in response to a received recording request. As has also been previously described, a recording storage identifier 510 identifying the content is associated with user-specific recording scheduling information for each program requested to be recorded by the user, which may be generated after the content is recorded or upon initial scheduling of the recording.

Additionally, an encryption key 512 may be provided and associated with each user recording request that allows for decrypting the recorded content for playback. The encryption key 512 may be unique to the user devices and/or may be unique to each playback request. It will be appreciated that the encryption key for each user recording may be generated upon recording/storing of the content and associated with the recording 502a for the user for example, or the encryption key may be generated using a JITP approach upon receipt of a playback request.

In FIG. 5, a start time 514 indicated in the user's recording scheduling information for recording request entry 502a may be part way through the transmission of the content (i.e. after the content has started), and accordingly the user A may only playback the portion of the recorded content from 7:24 to 8:00. That is, the user A may be prevented from playing back earlier portions of recorded content, even if the recorded content associated with the same recording storage identifier "1111" comprises a full copy of the program that was requested to be recorded.

Figure 6:
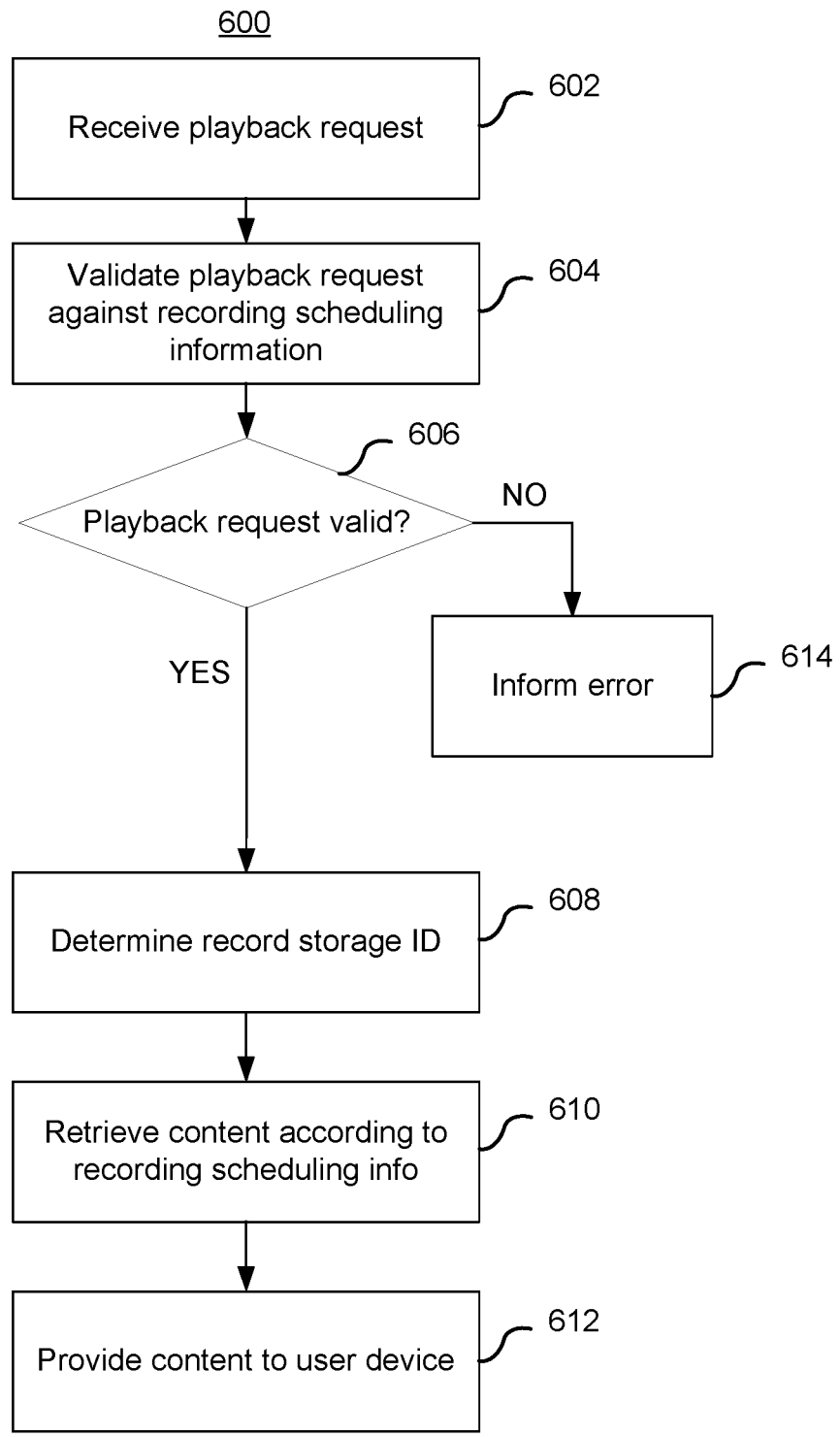
FIG. 6 shows a method of retrieving stored nPVR content for playback.

FIG. 6 shows a method of retrieving stored nPVR content for playback. A playback request is received (602). The playback request may be received from any device (i.e. a registered device) associated with a user, and does not necessarily have to be the same device that sent the recording request. The playback request is validated against the recording scheduling information stored for the user (604). The playback request may take many forms, particularly depending on the UI that the user is interacting with on their device, and may not comprise all of the information stored in the users' nPVR data. For example, a user's selection of a recording may transmit the recording scheduling information and/or the recording storage identifier. In another example, a user may search through their scheduled recordings and see a recording with a program title and a date, which they then select and which information is transmitted as the playback request. In a further example, a user may be able to search for recordings and request playback based on program title alone. Upon receipt of the playback request, the nPVR manager 102 accesses the users' nPVR data 104 to determine whether the user is allowed to playback the requested recorded content. Such validation of the playback request involves determining recording scheduling information (if any) associated with the user for the requested recorded content, and may result in determining that the user is entitled to playback the recorded content in its entirety, a certain portion(s) of the recorded content, or is not entitled to playback the recorded content at all. The user may not be entitled to playback the recorded content if there is no recording scheduling information with a channel number and start/end times falling within a time during which the requested content was distributed/aired. If a recording storage identifier is included in the playback request, the users' nPVR data can be parsed for any recording scheduling information for the user that is associated with the recording storage identifier. If the playback request only comprises a program title and a date, for example, the nPVR manager may parse previous EPG data across all channels on the specified date to search for the program title and determine the channel number(s) and start/end time(s); the nPVR manager may then parse the users' nPVR data to determine if there is a corresponding recording scheduling information.

A determination is made if the user's playback request is valid based on the user's recording scheduling information and the requested recording (606). If the playback request is not valid (NO at 606), the user is informed of an error (614) (e.g. they did not request to record the content, and therefore cannot retrieve the recorded content for playback). If the playback request is valid (YES at 606), the recording storage identifier for the recorded content that is associated with the recording scheduling information for the user is determined in order to retrieve the content (608). In some instances the recording storage identifier may be provided in the playback request. The recorded content (or portions thereof) is retrieved according to the user's recording scheduling information (610). That is, if a user had only requested to record part of the content they may only playback this portion of the recorded content, even though the entirety of the content may have been recorded and stored. The content is provided to the user device (612). Providing the content to the user device may comprise encrypting the recorded content and transmitting the encrypted content to the user device along with an encryption key.

Figure 7A:
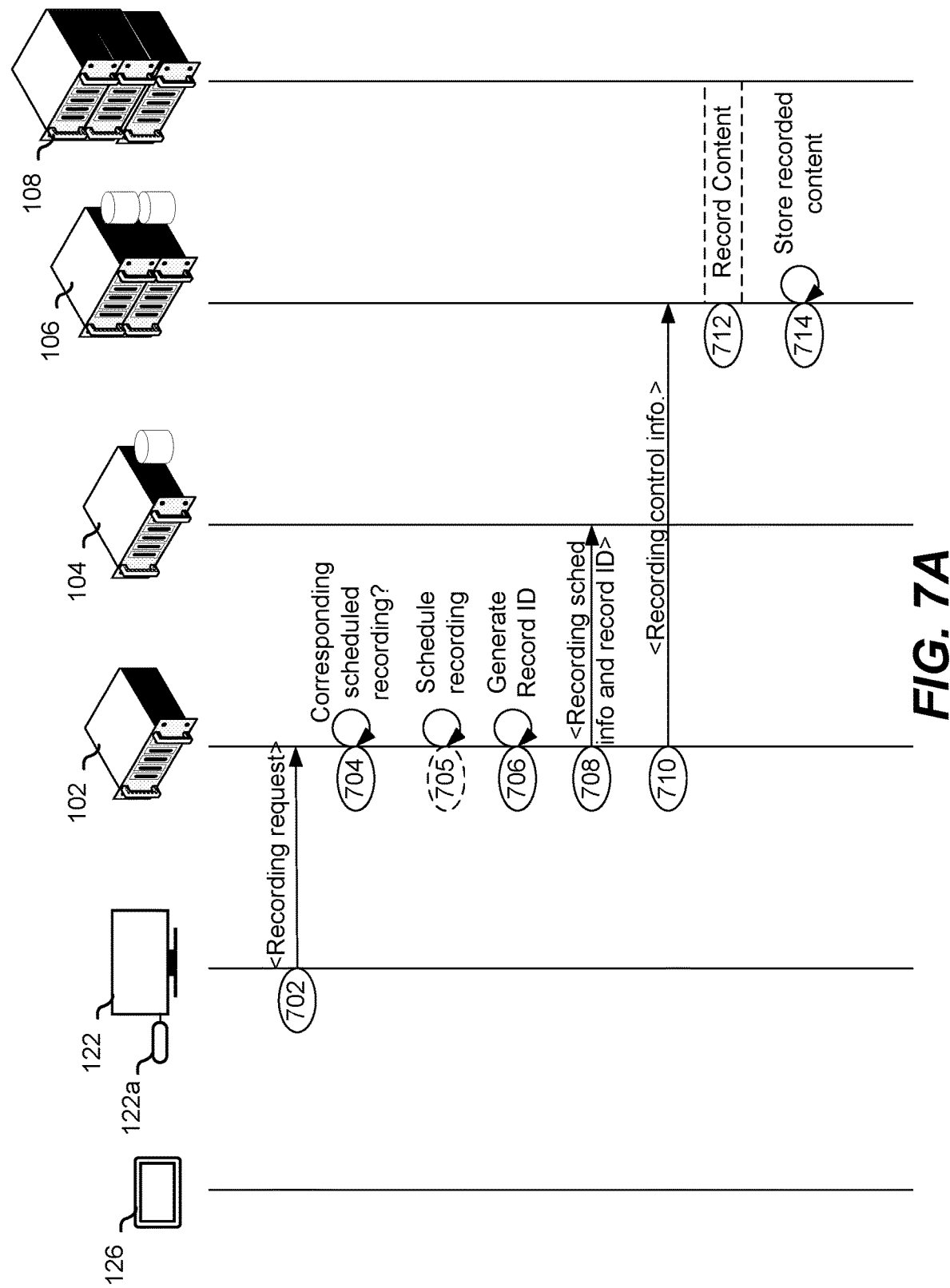
FIGS. 7A and 7B show a communication flow diagram for managing personal video recordings.
Figure 7B:
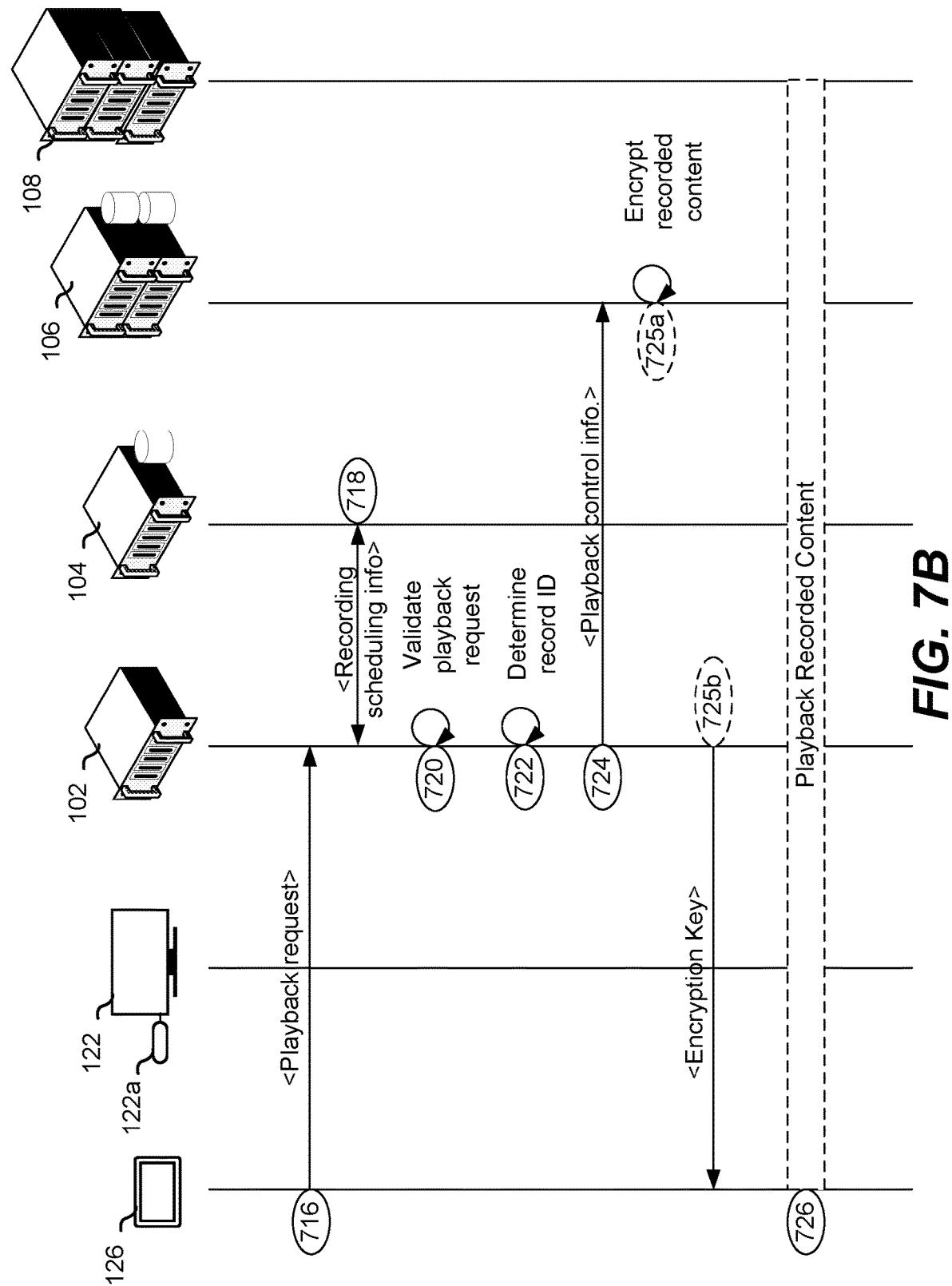

FIGS. 7A and 7B show a communication flow diagram for managing personal video recordings. The communication flow diagram depicts just one possible process flow for managing personal video recordings and a person skilled in the art will recognize that certain elements of the communication flow process may be performed in a different order and/or by different entities without departing from the scope of this disclosure.

A recording request is sent from STB 122a associated with TV display 122 to the nPVR manager 102 (702). The nPVR manager 102 determines recording scheduling information from the received recording request and determines if there is an existing scheduled recording that corresponds to the user's recording scheduling information (704). The nPVR manager 102 may schedule a recording in accordance with the determined recording scheduling information determined from the received recording request (705), such as by scheduling a new recording or modifying an existing scheduled recording, if a corresponding scheduled recording does not exist.

The nPVR manager 102 generates a specific recording storage identifier for the requested recording (706). The recording storage identifier particular to a requested recording may also be generated after the content is recorded, however FIG. 7 shows the recording storage identifier being generated upon scheduling of the recording. It will be appreciated that it may also be possible that the recording storage identifier was previously generated where a scheduled recording corresponding to the user's recording scheduling information of the received recording request was found to already exist. The nPVR manager 102 stores the recording scheduling information of the received recording request and the recording storage identifier associated with the content (for the user) in users' nPVR data 104 (708). The nPVR manager 102 sends recording control information to the content storage 106 for co-ordinating recording of the content as scheduled (e.g. as specified by the global scheduling information) (710). The content is recorded as it is distributed from the content delivery platform(s) 108 (712). The recorded content is stored in nPVR content storage 106 in association with its recording storage identifier (714).

A playback request that requests playback of recorded content is sent from the user's device to the nPVR manager 102 (716). The playback request may be sent from any user device connected to the Internet or other suitable network and associated with a user/subscriber profile/account. The playback request could come from the STB 122a, for example; however FIG. 7B shows the playback request being received from the user's tablet 126. It will be appreciated that the playback request may be received from other user devices as well, such as a smart phone, computer, etc. The nPVR manager 102 retrieves recording scheduling information for the user from the users' nPVR data 104 (718), and validates the recording request (720), as for example described with reference to FIG. 6. When the playback request is valid, a recording storage identifier associated with the requested recorded content is determined (722). The nPVR manager 102 generates and sends playback control information to the nPVR content storage 106 (724), which may indicate what portions of content the user is allowed to playback based on the user's recording scheduling information. The playback control information may also generate and send an encryption key as part of the playback control information to be used for encrypting the recorded content for transmission to the user device. In this case, the content is encrypted (725*a*) and the encryption key is also provided to the user device (725*b*). The tablet 126 plays back the recorded content from the content storage 106 (726), which may for example be delivered over the content deliver platform(s) 108.

It would be appreciated by one of ordinary skill in the art that the system and components shown in FIGS. 1-7 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A method of managing personal video recordings by a network personal video recorder (nPVR), comprising:
   receiving a recording request from a user's device to record content;
   determining recording scheduling information from the recording request;
   determining if there is an existing scheduled recording to record the content that corresponds to the recording scheduling information of the recording request, by accessing a list of existing scheduled recordings that have been scheduled in response to recording requests from a plurality of users;
   upon determining that there is no existing scheduled recording corresponding to the recording scheduling information of the recording request, scheduling a recording of the content in accordance with the recording scheduling information of the recording request;
   storing the recording scheduling information for the user, independent of whether there is determined to be an existing scheduled recording to record the content;
   recording the content during transmission of the content in accordance with the scheduled recording; and
   storing a single recording of the recorded content in association with a recording storage identifier, wherein the recording storage identifier is associated with the recording scheduling information received in the recording request from the user, and wherein the single recording of the recorded content is accessible for playback to different users that requested to record the content, and playback of the recorded content by respective users is based on recording scheduling information received in respective recording requests from the respective users to record the content.

2. The method of claim 1, wherein scheduling the recording of the content in accordance with the recording scheduling information of the recording request comprises modifying an existing scheduled recording.

3. The method of claim 2, wherein modifying the existing scheduled recording comprises modifying at least one of a start time and an end time specified in the existing scheduled recording.

4. The method of claim 1, wherein scheduling the recording of the content in accordance with the recording scheduling information of the recording request comprises scheduling a new recording.

5. The method of claim 1, wherein the recording scheduling information comprises a channel number, a date, a start time, and an end time.

6. The method of claim 5, wherein determining if there is a scheduled recording that corresponds to the recording scheduling information of the recording request comprises determining if the start time and the end time in the recording scheduling information of the recording request falls within a start time and an end time of a scheduled recording for the same channel number and date.

7. The method of claim 1, wherein the recording request comprises a device identifier of the user's device.

8. The method of claim 1, wherein the recording request comprises information indicative of a geographic location of the user's device.

9. The method of claim 8, wherein determining if there is an existing scheduled recording that corresponds to the recording scheduling information of the recording request comprises determining that an existing scheduled recording is for a geographic area comprising the geographic location of the user's device.

10. The method of claim 1, wherein the recording storage identifier is generated after recording of the content.

11. The method of claim 1, wherein the recording storage identifier is generated upon scheduling the recording.

12. The method of claim 1, further comprising maintaining a cache of frequently requested scheduled recordings to facilitate the determination of whether there is an existing scheduled recording that corresponds to the recording scheduling information of the recording request.

13. The method of claim 1, further comprising:
   receiving a playback request from the user's device to playback requested recorded content;
   validating the playback request against recording scheduling information stored for the user;
   determining a requested recording storage identifier associated with the recording scheduling information stored for the user corresponding to the requested recorded content;
   retrieving, using the requested recording storage identifier, the requested recorded content according to the recording scheduling information; and
   providing the requested recorded content to the user's device in accordance with the recording scheduling information stored for the user.

14. The method of claim 13, wherein the user's device from which the playback request is received is a different device associated with the user than the user's device from which the recording request is received.

15. The method of claim 13, wherein the requested recorded content retrieved and provided to the user's device is a portion of the recorded content stored in association with the recording storage identifier as defined by the user's recording scheduling information.

16. The method of claim 13, wherein providing the recorded content comprises encrypting the recorded content for transmission to the user's device and providing a decryption key for the user that allows for playback of the recorded content.

17. The method of claim 16, wherein the decryption key for the user is generated in response to receiving the playback request.

18. A network personal video recorder (nPVR) system for managing personal video recordings, comprising:
   a processing device that interfaces with one or more content delivery platforms to record content in accordance with scheduled recordings, and is communicatively coupled with a plurality of user devices over a network to receive recording requests for recording the content and playback requests for playing back recorded content;

a content storage that stores the recorded content in association with a recording storage identifier; and a data storage that stores personal video recording (PVR) data for each of a plurality of users, the PVR data comprising, in association with respective users, recording scheduling information for content that the user has requested to be recorded, and the recording storage identifier associated with the content for retrieval of the recorded content from the content storage, wherein the processing device is configured to:

receive a recording request from a user's device to record content;

determine recording scheduling information from the recording request;

determine if there is an existing scheduled recording to record the content that corresponds to the recording scheduling information of the recording request, by accessing a list of existing scheduled recordings that have been scheduled in response to recording requests from a plurality of users;

upon determining that there is no existing scheduled recording corresponding to the recording scheduling information of the recording request, schedule a recording of the content in accordance with the recording scheduling information of the recording request;

store the recording scheduling information for the user, independent of whether there is determined to be an existing scheduled recording to record the content;

record the content during transmission of the content in accordance with the scheduled recording; and store a single recording of the recorded content in association with a recording storage identifier, wherein the recording storage identifier is associated with the recording scheduling information received in the recording request from the user, and wherein the single recording of the recorded content is accessible for playback to different users that requested to record the content, and playback of the recorded content by respective users is based on recording scheduling information received in respective recording requests from the respective users to record the content.

19. The system of claim 18, wherein the processing device is further configured to:

receive a playback request from the user's device to playback requested recorded content;

validate the playback request against the recording scheduling information stored for the user in the data storage;

determine a requested recording storage identifier associated with the recording scheduling information stored for the user corresponding to the requested recorded content;

retrieve the requested recorded content from the content storage according to the recording scheduling information and using the requested recording storage identifier; and provide the requested recorded content to the user's device in accordance with the recording scheduling information stored for the user.

\* \* \* \* \*